United States Patent Office 2,794,041
Patented May 28, 1957

2,794,041
DITHIOPHOSPHATE ESTERS

George R. Norman and William M. Le Suer, Euclid, and Thomas W. Mastin, Willoughby, Ohio, assignors to The Lubrizol Corporation, Wickliffe, Ohio, a corporation of Ohio No Drawing. Application October 7, 1953,
Serial No. 384,788

1 Claim. (Cl. 260—461)

This application is a continuation-in-part of Serial No. 171,248, filed June 29, 1950, now abandoned.

The present invention relates to new and useful triesters of dithiophosphoric acids. The dithiophosphate esters can be more exactly defined by the formula:

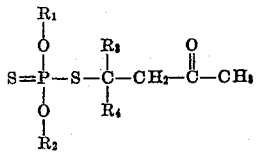

wherein $R_1$ and $R_2$ are chosen from the group consisting of alkyl, aralkyl, aryl, and alkaryl radicals, and $R_3$ and $R_4$ are, broadly, members of the class consisting of hydrogen and organic radicals, more particularly, in which at least one of the radicals $R_3$ and $R_4$ is an organic radical. In the preferred instance, $R_3$ and $R_4$ are selected from the group consisting of hydrogen and the methyl radical.

In the dithiophosphate esters defined by the formula above, $R_1$ and $R_2$ may be the same or different radicals. The term alkyl radicals, as used in the specification and appended claims, is meant to include the straight chain and branch chain, the saturated and unsaturated, and the cycloaliphatic hydrocarbon radicals. The radicals $R_1$ and $R_2$ in the above formula may also carry halogen substituents, preferably chlorine and bromine. Examples of $R_1$ and $R_2$ include the methyl, ethyl, n-propyl, isopropyl, isobutyl, sec.-amyl, n-hexyl, 2-ethylhexyl, n-octyl, nonyl, n-decyl, n-dodecyl, n-octadecyl, oleyl, cetyl, ceryl, radicals derived from paraffin wax, allyl, bromo-methyl, 2-chloro ethyl, cyclohexyl, methyl-chlorohexyl, ethyl cyclohexyl, benzyl phenyl, p-chlorophenyl, tolyl, xylyl, naphthyl radicals, etc.

In the above formula, $R_3$ and $R_4$ may be hydrogen or an organic radical, the latter including the alkyl, aryl, or heterocyclic radicals preferably containing from 1 to 10 carbon atoms, most desirably the alkyl radicals, with special preference given to the methyl radicals. Suitable examples of organic radicals $R_3$ and $R_4$ are, for example, methyl, ethyl, n-propyl, iso-propyl, t-butyl, t-octyl, phenyl, tolyl, ethyl-phenyl, t-butyl-phenyl, naphthyl, chlorophenyl, furfuryl, furyl, thienyl, pyridyl, quinolyl, piperidyl, etc., radicals.

The dithiophosphate esters are easily prepared by condensing a dithiophosphoric acid of the formula:

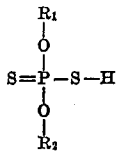

wherein $R_1$ and $R_2$ are as defined above, with an $\alpha,\beta$-unsaturated ketone of the formula:

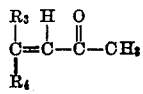

wherein $R_3$ and $R_4$ are as defined above. The reaction of dithiophosphoric acids with unsaturated ketones is more particularly illustrated in the specific examples hereinafter.

The reaction takes place quite readily and the particular dithiophosphoric acid is merely combined in a suitable reaction vessel with the unsaturated ketone. While the stoichiometry of the reaction:

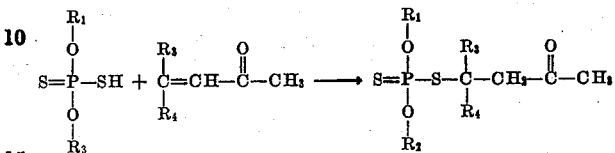

involves equal molecular proportions of the two reactants, an excess of either reactant, preferably the unsaturated ketone, may be used if desired. The reaction of a dithiophosphoric acid with an unsaturated ketone will take place within the broad temperature range from about 10° C. to about 200° C., preferably from about 20° C. to about 150° C. In general, the lower temperatures falling within the range above stated are preferred, since they are easier and more economical to use and have a lesser tendency to cause decomposition of the products. The unsaturated ketones contain activated double bonds and the reaction usually proceeds exothermically. Thus, it may be necessary to cool the reaction mass or bring the reactants together at such a slow rate that overheating of the reaction mass is prevented. However, after the main exothermic reaction has subsided, it will be usually found desirable to further heat the reaction mass for a short time, usually for at least about one-half hour, to maintain it within the temperature range given above until the reaction has been completed. The exothermic reaction may be readily controlled by carrying it out in the presence of an inert solvent, such as, ethyl acetate, amyl acetate, 2-ethylhexyl acetate, methyl propionate, methyl butyrate, ethyl butyrate, isopropyl butyrate, dioxane, benzene, nitro-benzene, chloro-benzene, toluene, xylene, chloroform and carbon tetrachloride.

The reaction mass will be maintained at the reaction temperature for a period of time long enough such that the acidity of the reaction mixture is substantially reduced. When the acidity has decreased to a substantially constant value, completion of the reaction is indicated. If desired, the product may be purified by treatment with aqueous alkali, followed by distillation. In most instances, however, the product is sufficiently pure for the contemplated uses without resorting to such purification.

The following specific examples further illustrate the invention.

Example 1

Mesityl oxide (55 g., 0.56 mole) was added dropwise to 177 g. (0.50 mole) of O,O-di-2-ethylhexyl-thiolthionophosphoric acid, the temperature rising to 50° C. during the addition. The reaction mass was then stirred at room temperature for a period of nine hours, until the acid number had reached a substantially constant value. The acid number of the resulting solution was 15.0. The reaction mixture was then washed with a 10% excess of one-normal KOH solution. After washing with water, the product was dried over anhydrous MgSO$_4$, the excess unsaturated ketone was removed under reduced pressure, and the residue was fractionated by vacuum distillation. The resulting product, substantially pure O,O-di-2-ethylhexyl - S - (2 - methyl - 4 - oxo - 2 - pentyl) dithiophosphate (92.0% yield), had the following analysis:

Calculated for $C_{22}H_{45}O_3PS_2$: percent P, —6.85; percent S, —14.15. Found: percent P, —6.98; percent S, —14.68.

Example 2

Benzal acetone (146 g., 1.0 mole) was added dropwise slowly to 354 g. (1.0 mole) of O,O-di-2-ethylhexylthiolthionophosphoric acid, the temperature rising to 53° C. during the addition. The mixture was allowed to react at room temperature for a period of 18 hours until the acid number had reached a substantially constant value (6.5). The resulting product, substantially pure O,O-di-2-ethylhexyl-S-(1-phenyl-3-oxo-1-butyl) dithiophosphate (100% yield), had the following analyses:

Calculated for $C_{26}H_{45}O_3PS_2$: Percent P, —6.20; percent S, —12.80. Found: Percent P, —6.28; percent S, 13.71.

Example 3

Furfural acetone (136 g., 1.0 mole) was added dropwise slowly to 354 g. (1.0 mole) of O,O-di-2-ethylhexyl-thiolthionophosphoric acid. The mixture was allowed to react at room temperature for a period of 16 hours until the acid number had reached a substantially constant value (13.8). The resulting product, substantially pure O,O - di-2-ethylhexyl-S-(1-α-furyl-3-oxo-1-butyl) dithiophosphate (100% yield), had the following analyses:

Calculated for $C_{24}H_{43}O_4PS_2$: Percent P, —6.33; percent S, —13.05. Percent P, —6.38; percent S, 13.82.

The chemical compounds of this invention have a wide variety of usefulness, for example, as addition agents for lubricants and plasticizers.

Other modes of applying the principle of the invention may be employed, change being made as regards the details described, provided the features stated in the following claim, or the equivalent of such, be employed.

We therefore particularly point out and distinctly claim as our invention:

As new chemical compounds, the phosphate esters of the formula:

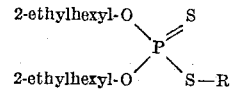

wherein R is a gamma-ketonic radical selected from the class consisting of 2-methyl-4-oxo-2-pentyl, 1-phenyl-3-oxo-1-butyl, and 1-α-furyl-3-oxo-1-butyl radicals.

References Cited in the file of this patent

UNITED STATES PATENTS 2,632,600   Hoegberg _____ Mar. 17, 1953